United States Patent
Bian

(10) Patent No.: US 11,513,286 B2
(45) Date of Patent: Nov. 29, 2022

(54) HETEROGENOUS OPTICAL POWER SPLITTER/COMBINER

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/026,799

(22) Filed: Sep. 21, 2020

(65) Prior Publication Data
US 2022/0091335 A1    Mar. 24, 2022

(51) Int. Cl.
*G02B 6/122* (2006.01)
*G02B 6/13* (2006.01)
*G02B 6/12* (2006.01)

(52) U.S. Cl.
CPC ............ *G02B 6/1228* (2013.01); *G02B 6/13* (2013.01); *G02B 2006/1215* (2013.01)

(58) Field of Classification Search
CPC .................................................. G02B 6/1228
See application file for complete search history.

(56) References Cited

U.S. PATENT DOCUMENTS

| | | | | |
|---|---|---|---|---|
| 9,128,240 B2 * | 9/2015 | Hatori | ............... | G02B 6/12 |
| 9,703,047 B2 * | 7/2017 | Painchaud | ............ | G02B 6/305 |
| 10,197,734 B2 * | 2/2019 | Painchaud | ............ | G02B 6/125 |
| 10,429,582 B1 | 10/2019 | Bian et al. | | |
| 11,287,577 B2 * | 3/2022 | Wong | ............... | G02B 6/14 |
| 2012/0230635 A1 * | 9/2012 | Yoshida | ............... | G02B 6/125 |
| | | | | 385/43 |
| 2016/0377806 A1 * | 12/2016 | Ellis-Monaghan | ............... | G02B 6/12002 |
| | | | | 385/14 |
| 2018/0067259 A1 * | 3/2018 | Teng | ............... | G02B 6/3885 |
| 2021/0215606 A1 * | 7/2021 | Schmid | ............... | B01L 3/50857 |

(Continued)

OTHER PUBLICATIONS

Yang Wang, Shitao Gao, Ke Wang, and Efstratios Skafidas, "Ultra-broadband and low-loss 3 dB optical power splitter based on adiabatic tapered silicon waveguides," Opt. Lett. 41, 2053-2056 (2016).

(Continued)

*Primary Examiner* — Charlie Y Peng
(74) *Attorney, Agent, or Firm* — Thompson Hine LLP; Anthony Canale

(57) ABSTRACT

Structures for an optical power splitter/combiner and methods of forming a structure for an optical power splitter/combiner. A first waveguide core is positioned adjacent to a second waveguide core. The first waveguide core includes a first end surface and a first tapered section that tapers toward the first end surface. The second waveguide core includes a second end surface and a second tapered section that tapers toward the second end surface. A third waveguide core is positioned in a different level than the first waveguide core and the second waveguide core. The third waveguide core includes a third end surface and a third tapered section that tapers toward the third end surface. The third tapered section includes a portion laterally positioned between the first tapered section of the first waveguide core and the second tapered section of the second waveguide core.

20 Claims, 7 Drawing Sheets

(56) References Cited

U.S. PATENT DOCUMENTS

2021/0373243 A1* 12/2021 Krueger ................ G02B 6/305

OTHER PUBLICATIONS

J. X. B. Sia et al., "Mid-Infrared, Ultra-Broadband, Low-Loss, Compact Arbitrary Power Splitter Based on Adiabatic Mode Evolution," in IEEE Photonics Journal, vol. 11, No. 2, pp. 1-11, Apr. 2019, Art No. 6601111, doi: 10.1109/JPHOT.2019.2907788.

Liangshun Han, Bill P.-P. Kuo, Nikola Alic, and Stojan Radic, "Ultra-broadband multimode 3dB optical power splitter using an adiabatic couplerand a Y-branch," Opt. Express 26, 14800-14809 (2018).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski, C. Meagher, K. Nummy, A. Aboketat, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

* cited by examiner

HETEROGENOUS OPTICAL POWER SPLITTER/COMBINER

BACKGROUND

The present invention relates to photonics chips and, more specifically, to structures for an optical power splitter/combiner and methods of forming a structure for an optical power splitter/combiner.

Photonics chips are used in many applications and systems such as data communication systems and data computation systems. A photonics chip integrates optical components, such as waveguides, optical switches, and optical couplers, and electronic components, such as field-effect transistors, into a unified platform. Among other factors, layout area, cost, and operational overhead may be reduced by the integration of both types of components.

An optical power splitter is an optical component that is commonly used in photonics chips to divide optical power between multiple waveguides with a desired coupling ratio. The same structure may be used as an optical power combiner that combines optical power received from multiple waveguides. Conventional optical power splitter/combiners tend to have a footprint that is larger than desired and, in addition, may exhibit an insertion loss that is higher than desired.

Improved structures for an optical power splitter/combiner and methods of forming a structure for an optical power splitter/combiner are needed.

SUMMARY

In an embodiment of the invention, a structure for an optical power splitter/combiner. The structure includes a first waveguide core and a second waveguide core positioned adjacent to the first waveguide core. The first waveguide core includes a first end surface and a first tapered section that tapers toward the first end surface. The second waveguide core includes a second end surface and a second tapered section that tapers toward the second end surface. The structure includes a third waveguide core positioned in a different level than the first waveguide core and the second waveguide core. The third waveguide core includes a third end surface and a third tapered section that tapers toward the third end surface. The third tapered section includes a portion laterally positioned between the first tapered section of the first waveguide core and the second tapered section of the second waveguide core.

In an embodiment of the invention, a method of forming a structure for an optical power splitter/combiner is provided. The method includes forming a first waveguide core and a second waveguide core positioned adjacent to the first waveguide core, and forming a third waveguide core positioned in a different level than the first waveguide core and the second waveguide core. The first waveguide core includes a first end surface and a first tapered section that tapers toward the first end surface. The second waveguide core includes a second end surface and a second tapered section that tapers toward the second end surface. The third waveguide core includes a third end surface and a third tapered section that tapers toward the third end surface. The third tapered section includes a portion that is laterally positioned between the first tapered section of the first waveguide core and the second tapered section of the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
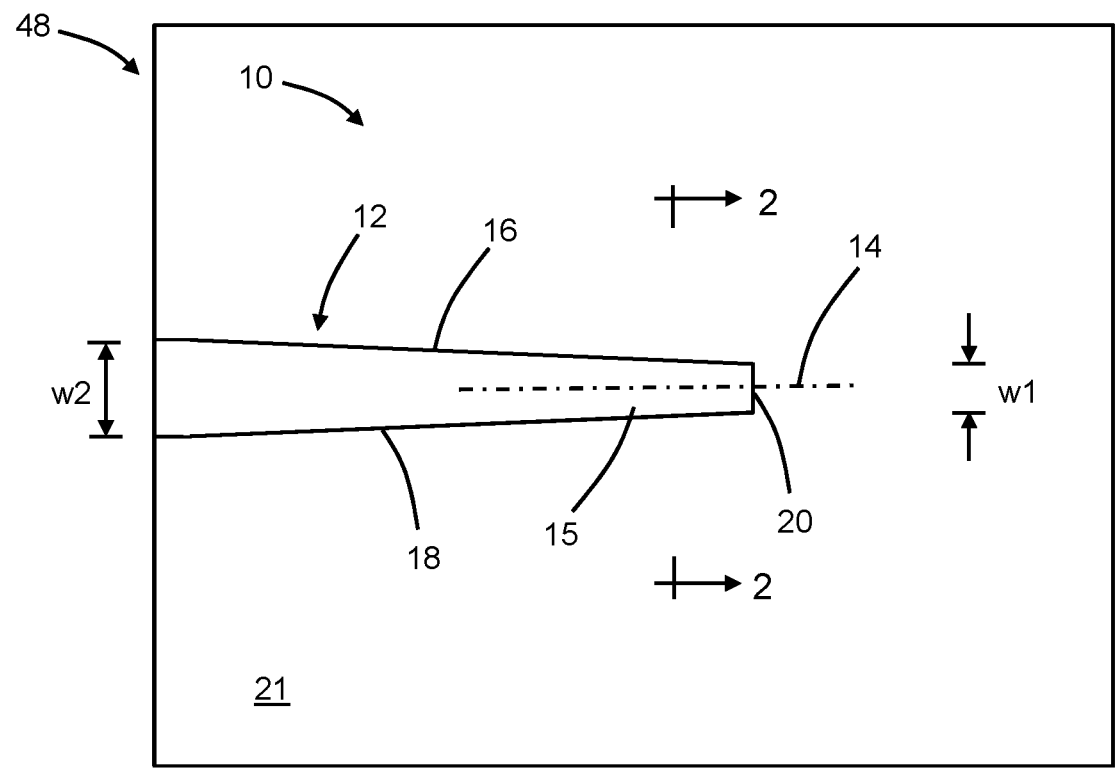
FIG. 1 is a diagrammatic top view of a photonics chip including a structure at an initial fabrication stage of a processing method in accordance with embodiments of the invention.
Figure 2:
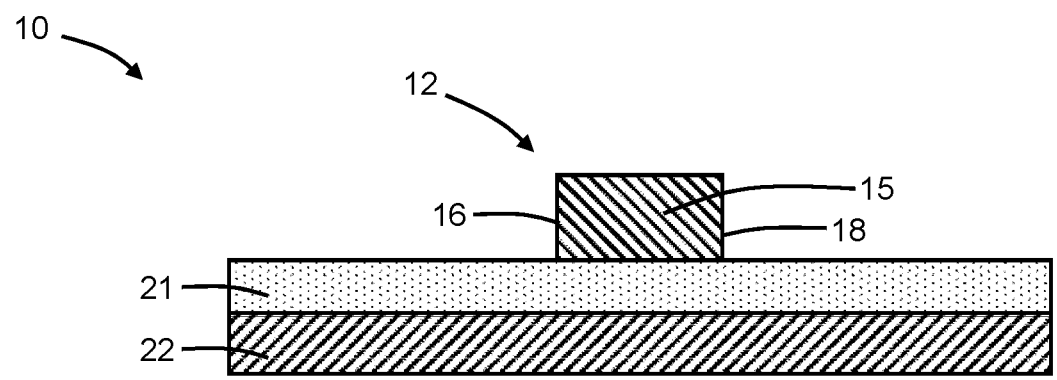
FIG. 2 is a cross-sectional view taken generally along line 2-2 in FIG. 1.

With reference to FIGS. 1, 2 and in accordance with embodiments of the invention, a structure 10 for an optical power splitter/combiner includes a waveguide core 12 that is positioned over a dielectric layer 21. The waveguide core 12 may have an end surface 20, a longitudinal axis 14, and a tapered section 15 that tapers in a direction parallel to the longitudinal axis 14 to terminate at the end surface 20. Opposite to the end surface 20, the waveguide core 12 extends away from the tapered section 15 participating in the structure 10. In an embodiment, the waveguide core 12 is truncated by the end surface 20 to provide a blunt end wall and, for that reason, the waveguide core 12 lacks a pointed or sharp tip defined by intersecting sidewalls at the end surface 20.

The waveguide core 12 may be comprised of a single-crystal semiconductor material, such as single-crystal silicon. In an embodiment, the single-crystal semiconductor material may originate from a device layer of a silicon-on-insulator (SOI) wafer that further includes a buried oxide layer providing the dielectric layer 21 and a substrate 22 comprised of a single-crystal semiconductor material, such as single-crystal silicon. The waveguide core 12 may be patterned from the layer of single-crystal semiconductor material by lithography and etching processes. The layer of single-crystal semiconductor material may be fully etched to define waveguide core 12 as a ridge waveguide as shown or, alternatively, only partially etched to define a rib waveguide including a thinned residual layer or slab on the dielectric layer 21. The waveguide core 12 may have coplanar or substantially coplanar top and bottom surfaces within the tapered section 15.

The waveguide core 12 has non-intersecting opposite side surfaces or sidewalls 16, 18 that terminate at the end surface 20, and a width dimension between the sidewall 16 and the sidewall 18 that varies in the tapered section 15. The width dimension of the waveguide core 12 changes over the length of the tapered section 15 from a width, W1, at the end surface 20 to a width, W2, that is greater than the width, W1. In an embodiment, the width, W1, may range from a value of $0.05*\lambda$, to a value of $0.18*\lambda$, and the width, W2, may range from a value of $0.2*\lambda$, to a value of $5*\lambda$, where $\lambda$, is the wavelength of the laser light being split or combined by the structure 10. In an embodiment, the width dimension of the tapered section 15 of the waveguide core 12 may linearly vary over its length based on a linear function. In an alternative embodiment, the width dimension of the tapered section 15 of the waveguide core 12 may non-linearly vary over its length based on a non-linear function, such as a quadratic, parabolic, or exponential function.

Figure 3:
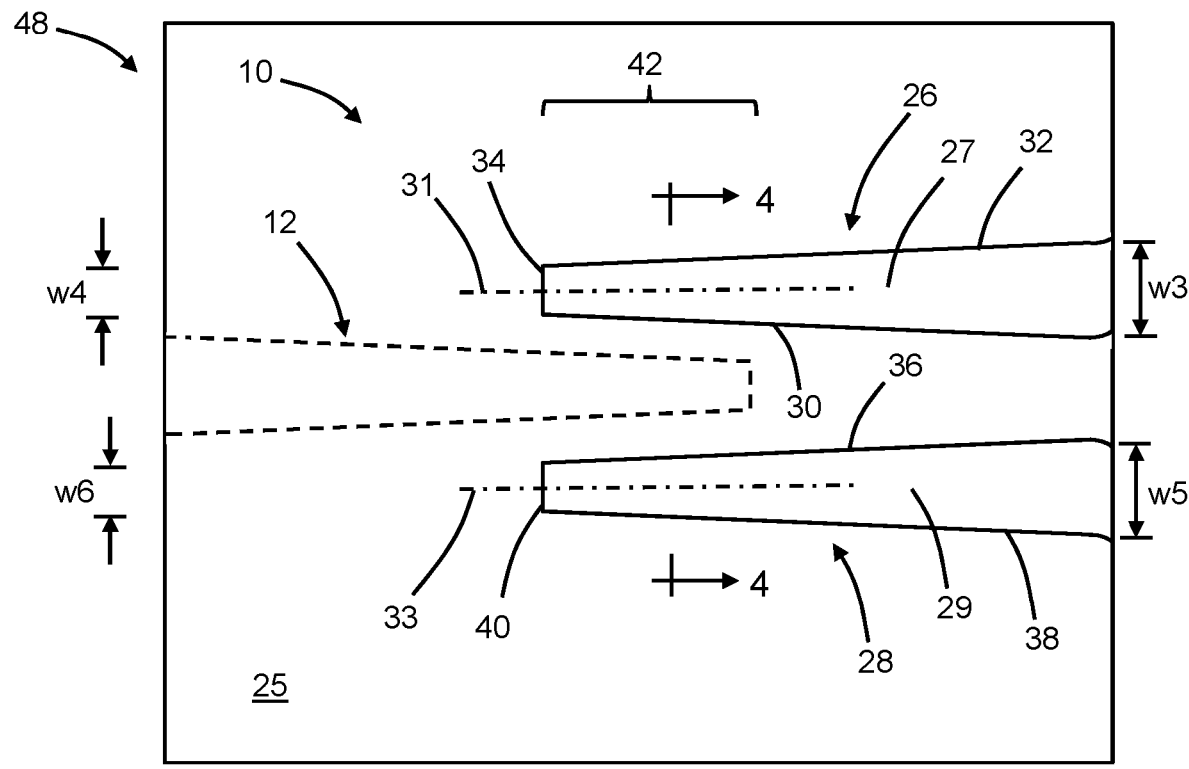
FIG. 3 is a diagrammatic top view of the structure at a fabrication stage of the processing method subsequent to FIG. 1.
Figure 4:
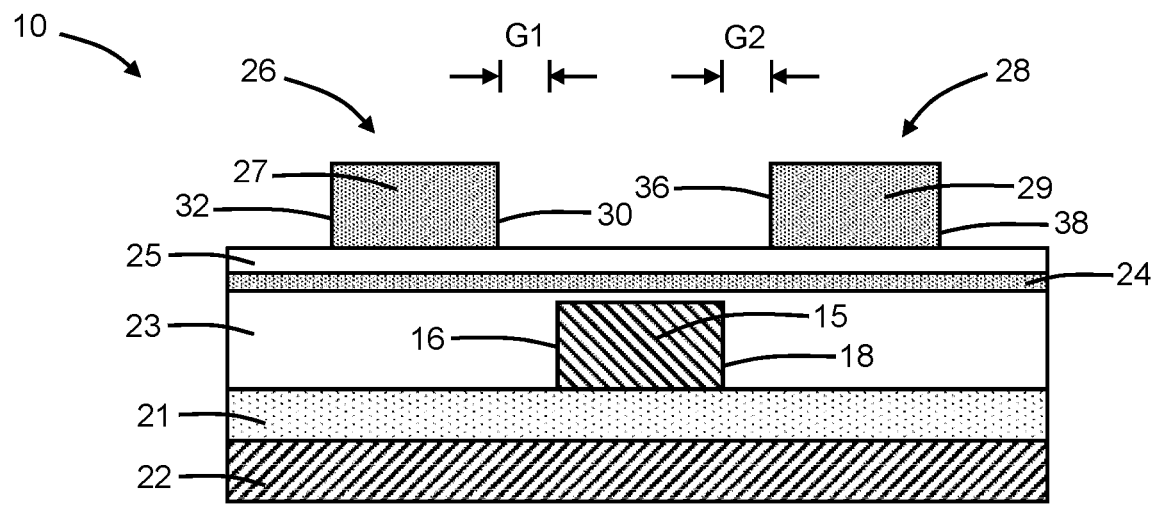
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 23 is formed over the waveguide core 12. The dielectric layer 23 may be comprised of a dielectric material, such as silicon dioxide, deposited by chemical vapor deposition and planarized with, for example, chemical mechanical polishing to remove topography. The waveguide core 12 is embedded and buried in the dielectric material of the dielectric layer 23, which provides low-index cladding for the waveguide core 12 of higher refractive index. Additional dielectric layers 24, 25 may be formed over the dielectric layer 23 and may be respectively comprised of silicon nitride and silicon dioxide. In an alternative embodiment, the dielectric layer 24 containing silicon nitride may be omitted.

A waveguide core 26 and a waveguide core 28 are formed on the dielectric layer 25. A tapered section 27 of the waveguide core 26 and a tapered section 29 of the waveguide core 28 are positioned with a juxtaposed, spaced-apart arrangement. The waveguide cores 26, 28 and the waveguide core 12 are positioned in different layers or levels. Specifically, the waveguide cores 26, 28 are located in a level or layer that is positioned in a vertical direction within a different plane from the level or layer of the waveguide core 12. The waveguide cores 26, 28 may be formed by depositing a layer of their constituent material on the dielectric layer 25 and patterning the deposited layer with lithography and etching processes. The deposited layer may be fully etched to define the waveguide cores 26, 28 as shown or, alternatively, only partially etched to define a thinned residual layer or slab on the dielectric layer 25. In an embodiment, the waveguide cores 26, 28 are comprised of a material having a different composition than the material contained in the waveguide core 12. In an embodiment, the waveguide cores 26, 28 may be comprised of silicon nitride. In alternative embodiments, the waveguide cores 26, 28 may be comprised of a different dielectric material, such as silicon oxynitride or aluminum nitride, or comprised of a III-V semiconductor material.

The waveguide core 26 extends along a longitudinal axis 31, and the tapered section 27 of the waveguide core 26 tapers in a direction parallel to its longitudinal axis 31 to terminate at an end surface 34. The waveguide core 28 extends along a longitudinal axis 33, and the tapered section 29 of the waveguide core 28 tapers in a direction parallel to its longitudinal axis 33 to terminate at an end surface 40. Opposite to the end surfaces 34, 40, the waveguide cores 26, 28 may include respective bends that diverge in order to increase the spacing between the waveguide cores 26, 28 and to route the split laser light away from the structure 10. In an embodiment, the waveguide cores 26, 28 are truncated by the respective end surfaces 34, 40 to provide blunt end walls and, for that reason, the waveguide cores 26, 28 lack a pointed or sharp tip defined by intersecting sidewalls at the end surfaces 34, 40.

The tapered sections 27, 29 of the waveguide cores 26, 28 each longitudinally taper (i.e., narrow in width) in a direction that is opposite to the direction of the longitudinal tapering of the tapered section 15 of the waveguide core 12. In an embodiment, the longitudinal axis 31 may be arranged parallel or substantially parallel to the longitudinal axis 33. In an embodiment, the longitudinal axes 31, 33 may be arranged parallel or substantially parallel to the longitudinal axis 14 of the waveguide core 12.

The waveguide core 26 has non-intersecting opposite side surfaces or sidewalls 30, 32 that terminate at the end surface 34, and a width dimension between the sidewall 30 and the sidewall 32 that varies in the tapered section 27. The width dimension of the waveguide core 26 changes over a length of the tapered section 27 from a width, W3, to a width, W4, at the end surface 34 that is less than the width, W3. The waveguide core 28 has non-intersecting opposite side surfaces or sidewalls 36, 38 that terminate at the end surface 40, and a width dimension between the sidewall 36 and the sidewall 38 that varies in the tapered section 29. The width dimension of the waveguide core 28 changes over a length of the tapered section 29 from a width, W5, to a width, W6, at the end surface 40 that is less than the width, W5. In an embodiment, the width, W4, and the width, W6, may range from a value of $0.05*\lambda$, to a value of $0.48*\lambda$, and the width, W3, and the width, W5, may range from a value of $0.5*\lambda$, to a value of $5*\lambda$. In an embodiment, the width dimensions of the tapered sections 27, 29 may linearly vary based on a linear function. In an alternative embodiment, the width dimensions of the tapered sections 27, 29 may non-linearly vary based on a non-linear function, such as a quadratic, parabolic, or exponential function, over its length.

In a region 42 of the structure 10, a portion of the tapered section 15 of the waveguide core 12 is laterally positioned with a juxtaposed arrangement between a portion of the tapered section 27 of the waveguide core 26 and a portion of the tapered section 29 of the waveguide core 28. The region 42 has a length measured from the end surface 20 of the waveguide core 12 to the end surfaces 34, 40 of the waveguide cores 26, 28. In an embodiment, the portion of the tapered section 15 of the waveguide core 12 and the adjacent portions of the tapered sections 27, 29 of the waveguide cores 26, 28 may have equal or substantially equal lengths in the region 42. In the region 42, the tapered section 15 of the waveguide core 12 is vertically positioned below the tapered sections 27, 29 of the waveguide cores 26, 28 and laterally positioned between the sidewall 30 of the waveguide core 26 and the sidewall 36 of the waveguide core 28.

The sidewall 30 of the tapered section 27 of the waveguide core 26 is laterally spaced from the sidewall 16 of the tapered section 15 of the waveguide core 12 in the region 42 by a coupling gap, G1. The sidewall 36 of the tapered section 29 of the waveguide core 28 is laterally spaced from the sidewall 18 of the tapered section 15 of the waveguide core 12 in the region 42 by a coupling gap, G2. In an embodiment, the tapered sections 27, 29 may be symmetrically arranged relative to the waveguide core 12 such that the splitting ratio from the waveguide core 12 to the waveguide cores 26, 28 is 50:50. In an embodiment with a symmetrical arrangement of the waveguide cores 26, 28 relative to the waveguide core 12, the coupling gap, G1, may be equal to the coupling gap, G2, at any given longitudinal position within the region 42 such that the waveguide core 12 is centered relative to the waveguide cores 26, 28. In an embodiment, the tapered sections 27, 29 may be asymmetrically arranged relative to the waveguide core 12 such that the splitting ratio from the waveguide core 12 to the waveguide cores 26, 28 differs from 50:50. In an embodiment with an asymmetrical arrangement of the waveguide cores 26, 28 relative to the waveguide core 12, the coupling gap, G1, may differ from the coupling gap, G2, at any given longitudinal position within the region 42. In an embodiment, the dimension of the coupling gap, G1, and the dimension of the coupling gap, G2, may range from a value of $0.03*\lambda$, to a value of $1.0*\lambda$.

In addition to the dimensions of the coupling gaps, the dimensions of the tapered section 15 of the waveguide core 12 and the tapered sections 27, 29 of the waveguide cores 26, 28, as well as the extent of their overlap in region 42, may be adjusted to impact the coupling efficiency and/or to change the coupling ratio of the structure 10.

Figure 5:
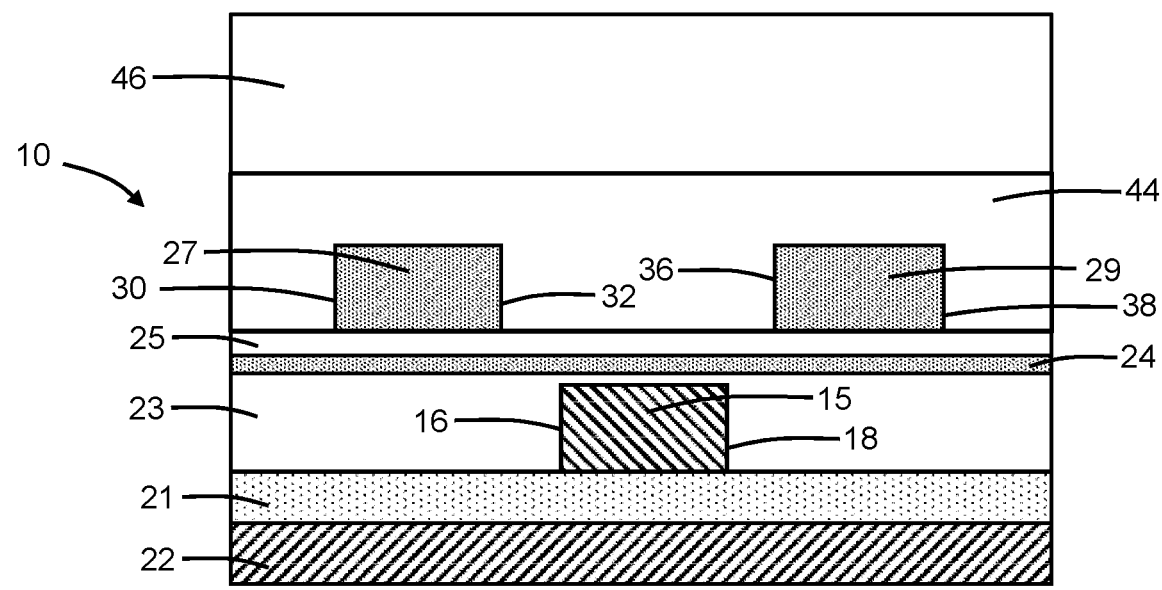
FIG. 5 is a cross-sectional view of the structure at a fabrication stage of the processing method subsequent to FIG. 4.

With reference to FIG. 5 in which like reference numerals refer to like features in FIG. 4 and at a subsequent fabrication stage, a dielectric layer 44 is formed over and about the waveguide cores 26, 28. The dielectric layer 44 may be comprised of a dielectric material, such as silicon dioxide, deposited by chemical vapor deposition and planarized with, for example, chemical mechanical polishing to remove topography. The waveguide cores 26, 28 are embedded or buried in the dielectric material of the dielectric layer 44, which provides low-index cladding.

A back-end-of-line stack 46 is formed over the dielectric layer 44. The back-end-of-line stack 46 includes one or more dielectric layers that may be comprised of dielectric material, such as silicon dioxide, and may include metallization comprised of, for example, copper or aluminum, that is arranged in the one or more interlayer dielectric layers.

The structure 10, in any of its embodiments described herein, may be integrated into a photonics chip 48 that includes electronic components and additional optical components. For example, the electronic components may include field-effect transistors that are fabricated by CMOS front-end-of-line (FEOL) processing.

In use, laser light may be guided on the photonics chip 48 by the waveguide core 12 from, for example, a fiber coupler or a laser coupler to the structure 10. The laser light is transferred from a lower level containing the waveguide core 12 to an upper level containing the waveguide cores 26, 28. The optical power of the laser light is divided or split by the structure 10 into one fraction or percentage that is transferred from the waveguide core 12 to the waveguide core 26 and another fraction or percentage that is transferred from the waveguide core 12 to the waveguide core 28. The laser light may be split equally (i.e., a coupling ratio of 50%:50%) or split substantially equally (i.e., a coupling ratio of approximately 50%:50%) if the waveguide cores 26, 28 are symmetrically arranged with respect to the waveguide core 12. Alternatively, the coupling ratio may be customized to differ from an equal or substantially equal split by asymmetrically arranging the waveguide cores 26, 28 with respect to the waveguide core 12. The waveguide core 26 and the waveguide core 28 separately guide the split laser light away from the structure 10. The spacing between the waveguide cores 26, 28 increases downstream from the structure 10 to eliminate interaction and crosstalk. Alternatively, the structure 10 may be used to combine the optical power of laser light received from the waveguide cores 26, 28 for output by the waveguide core 12 to, for example, a photodetector or a modulator.

The structure 10 provides a multi-level heterogenous optical power splitter/combiner that occupies a footprint that is smaller than those footprints of conventional optical power splitter/combiners. In addition to being more compact, the multi-level heterogenous optical power splitter/combiner may exhibit an insertion loss that is less than the insertion loss exhibited by conventional optical power splitter/combiners.

Figure 6:
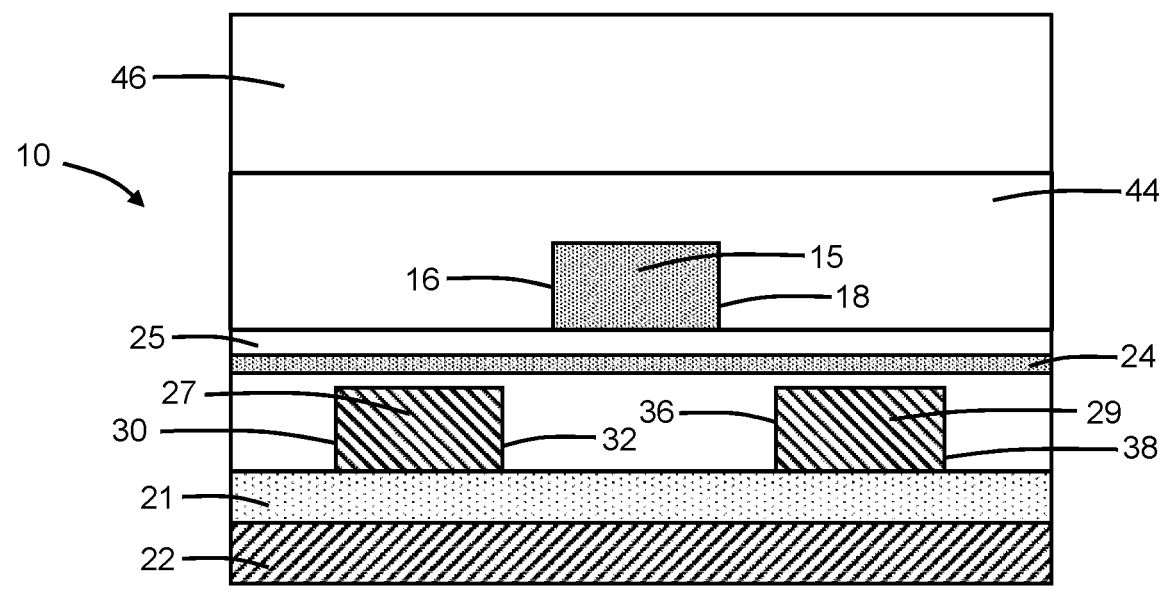
FIG. 6 is a cross-sectional view of a structure in accordance with alternative embodiments of the invention.

With reference to FIG. 6 in which like reference numerals refer to like features in FIG. 5 and in accordance with alternative embodiments of the invention, the materials used to construct the waveguide core 12 and the waveguide cores 26, 28 may be exchanged along with a change in the level in which each is located. The waveguide core 12, which is formed on dielectric layer 25, is arranged over and between the waveguide core 26 and the waveguide core 28. The waveguide cores 26, 28 may be comprised of a single-crystal semiconductor material, such as single-crystal silicon. The waveguide core 12 may be comprised of a dielectric material such as silicon nitride or, alternatively, the waveguide core 12 may be comprised of a different dielectric material, such as silicon oxynitride or aluminum nitride, or a III-V semiconductor material.

Figure 7:
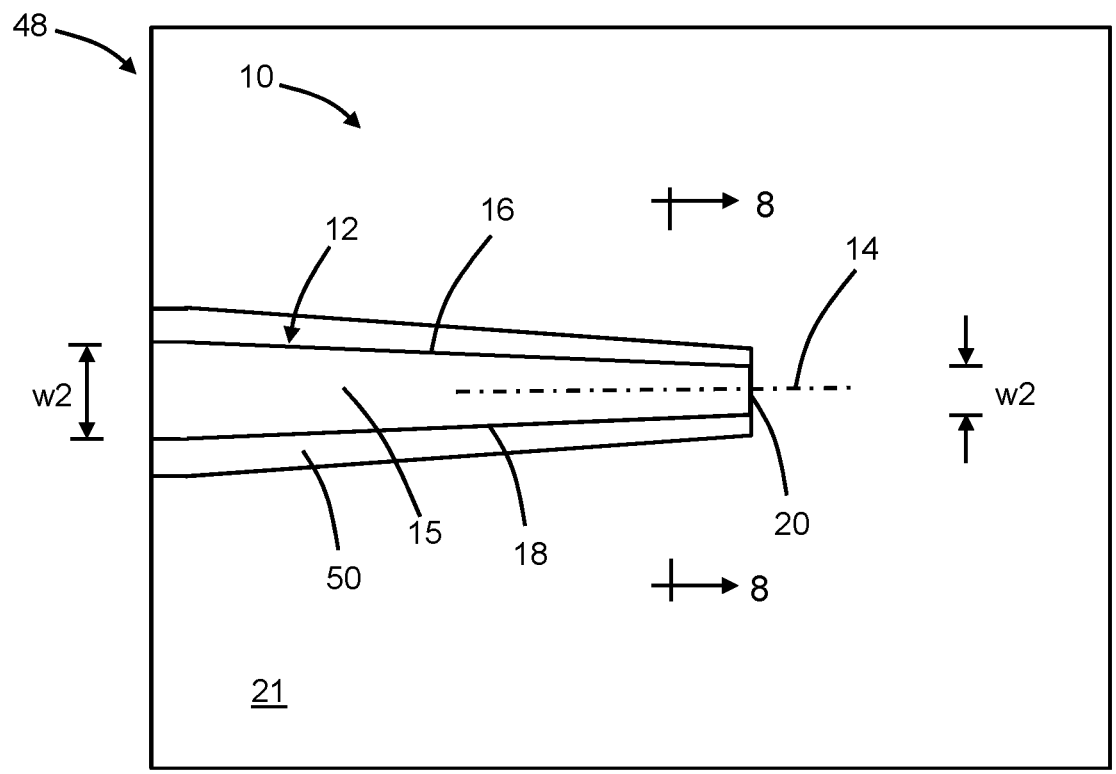
FIG. 7 is a top view of a structure in accordance with alternative embodiments of the invention.
Figure 8:
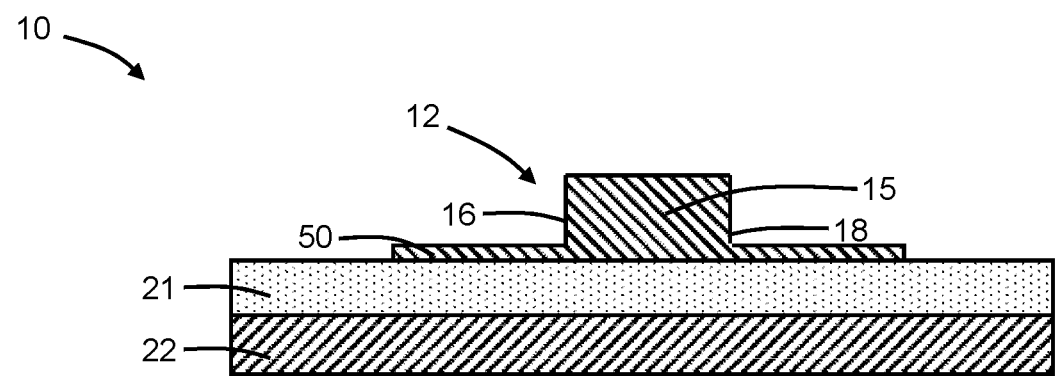
FIG. 8 is a cross-sectional view taken generally along line 8-8 in FIG. 7.

With reference to FIGS. 7, 8 in which like reference numerals refer to like features in FIGS. 1, 2 and in accordance with alternative embodiments of the invention, the waveguide core 12 may include a slab layer 50 that is located on and above the dielectric layer 21. The slab layer 50 may be formed by partially etching the layer of single-crystal semiconductor material when forming the waveguide core 12 and then patterning the partially etched layer with lithography and etching processes to provide a given shape. In the representative embodiment, the slab layer 50 may be patterned with a trapezoidal shape that tapers in the same direction as the tapering of the waveguide core 12. In an alternative embodiment, the slab layer 50 may be patterned with a rectangular shape that lacks tapering. In an embodiment, the slab layer 50 may terminate at or approximately at the location of the end surface 20 of the waveguide core 12.

Figure 9:
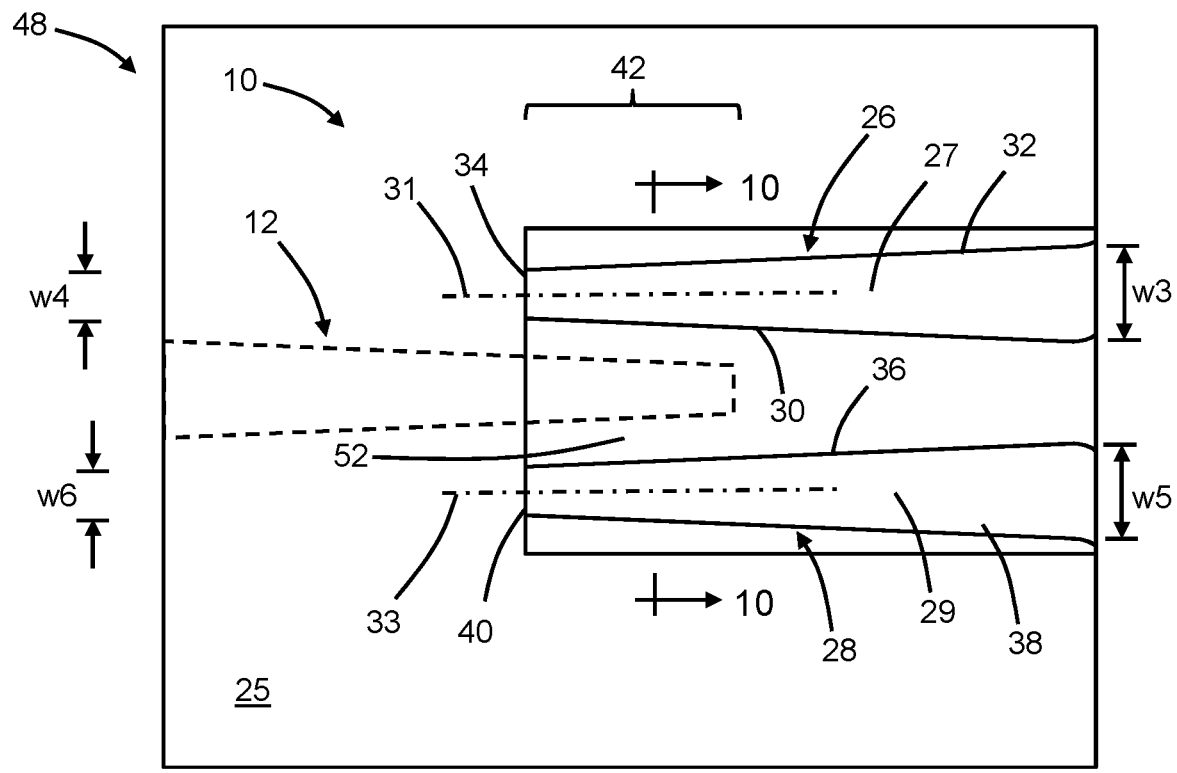
FIG. 9 is a top view of a structure in accordance with alternative embodiments of the invention.
Figure 10:
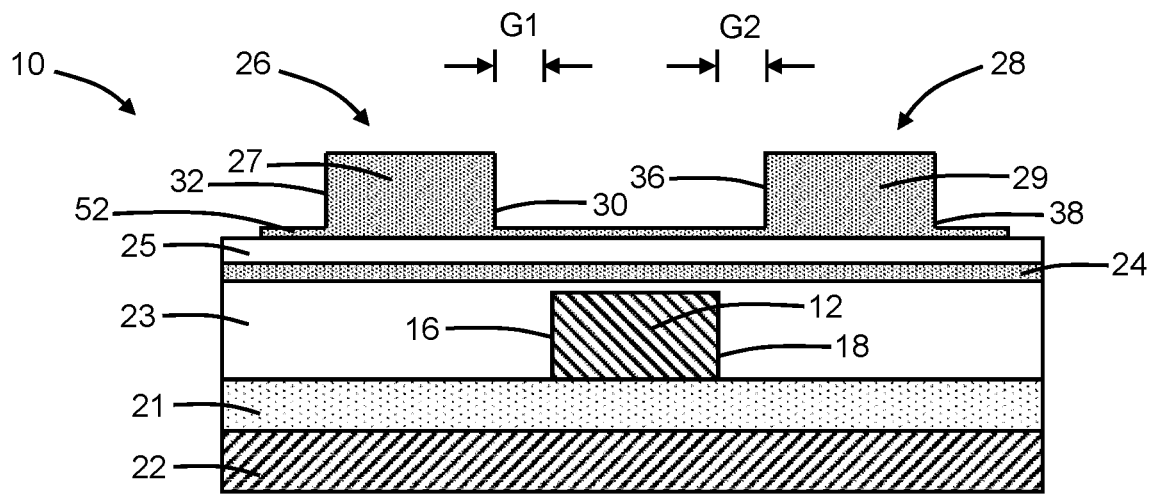
FIG. 10 is a cross-sectional view taken generally along line 10-10 in FIG. 9.

With reference to FIGS. 9, 10 in which like reference numerals refer to like features in FIGS. 3, 4 and in accordance with alternative embodiments of the invention, the waveguide cores 26, 28 may include a slab layer 52 that is located above and on the dielectric layer 25. The slab layer 52 may be formed by partially etching the layer of material deposited on the dielectric layer 25 when forming the waveguide cores 26, 28 and then patterning the partially etched layer with lithography and etching processes to provide a given shape. In the representative embodiment, the slab layer 52 may be patterned with a rectangular shape. In an alternative embodiment, the slab layer 52 may be patterned with a shape that tapers in the same direction as the tapering of the waveguide cores 26, 28. The slab layer 52 may terminate at or approximately at the location of the end surfaces 34, 40 of the waveguide cores 26, 28, and a portion of the slab layer 52 may be located in the space between the waveguide core 26 and the waveguide core 28. In an alternative embodiment, the structure 10 may further include the slab layer 50 (FIGS. 7, 8) in addition to the slab layer 52.

Figure 11:
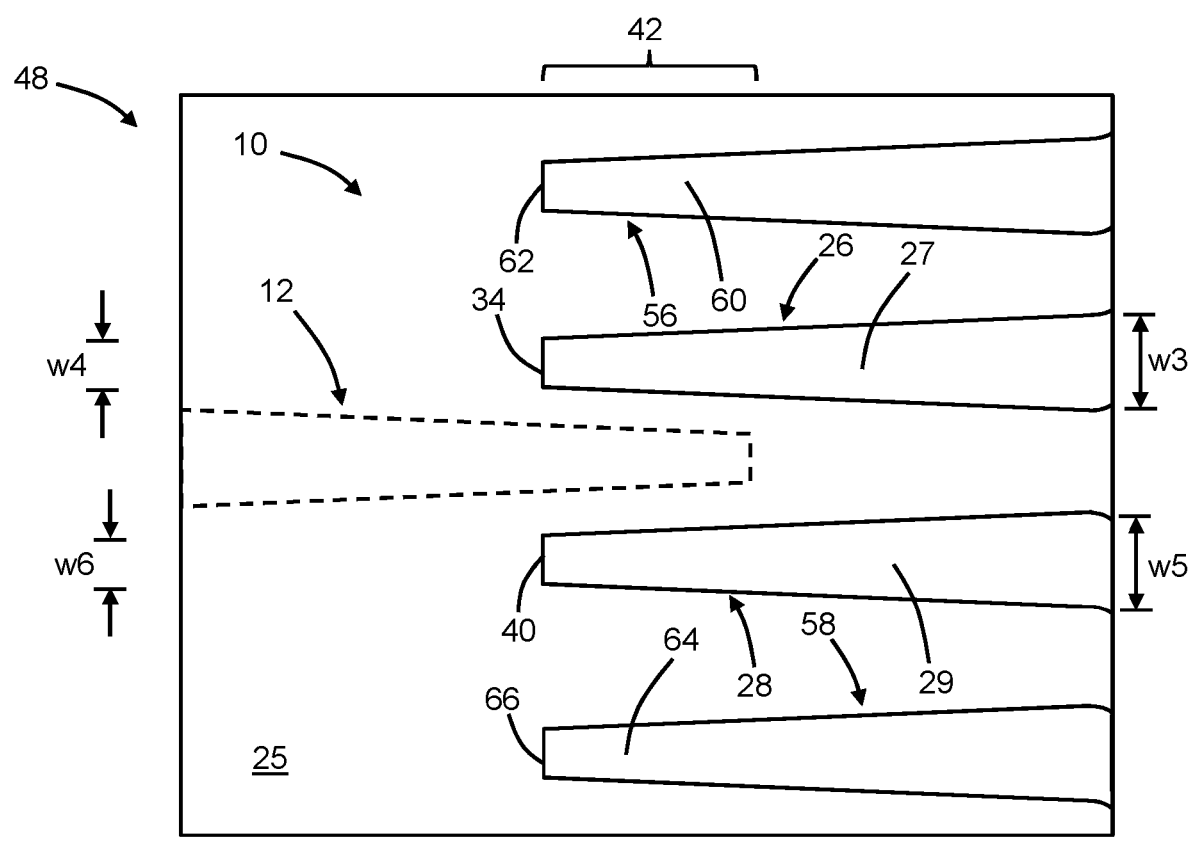
FIGS. 11-12 are top views of structures in accordance with alternative embodiments of the invention.

With reference to FIG. 11 in which like reference numerals refer to like features in FIG. 3 and in accordance with alternative embodiments of the invention, the structure 10 may be modified to add waveguide cores 56, 58 that are similar or identical to waveguide cores 26, 28. The waveguide cores 56, 58 are arranged in the same level as the waveguide cores 26, 28, and the waveguide cores 26, 28 are laterally positioned between the waveguide core 56 and the waveguide core 58. The waveguide core 56 includes a tapered section 60 having a portion arranged in the region 42 and terminating at an end surface 62. The waveguide core 58 includes a tapered section 64 having a portion arranged in the region 42 and terminating at an end surface 66. In an embodiment, the waveguide cores 26, 28 may be identical and symmetrically arranged relative to the waveguide core 12, and the waveguide cores 56, 58 may be identical and symmetrically arranged relative to the waveguide core 12.

Optical power is split by the operation of the structure 10 from the waveguide core 12 to each of the waveguide cores 26, 28, 56, 58 with a coupling ratio determined by the arrangement (e.g., symmetrical arrangement or asymmetrical arrangement) relative to the waveguide core 12 and potentially by differences in tapering among the tapered sections 27, 29, 60, 64. Additional waveguide cores (not shown) similar or identical to the waveguide cores 26, 28, 56, 58 may be added to the arrangement in order to increase the number of split output channels in the structure 10. In an embodiment, the number of waveguide cores may be an even number. In an alternative embodiment, the structure 10 may be modified to add only one or the other of the waveguide cores 56, 58 in order to provide an odd number of waveguide cores rather than an even number of waveguide cores. In an alternative embodiment, the waveguide core 12 may be positioned above and over the waveguide cores 26, 28, 56, 58 as described in connection with FIG. 6.

Figure 12:
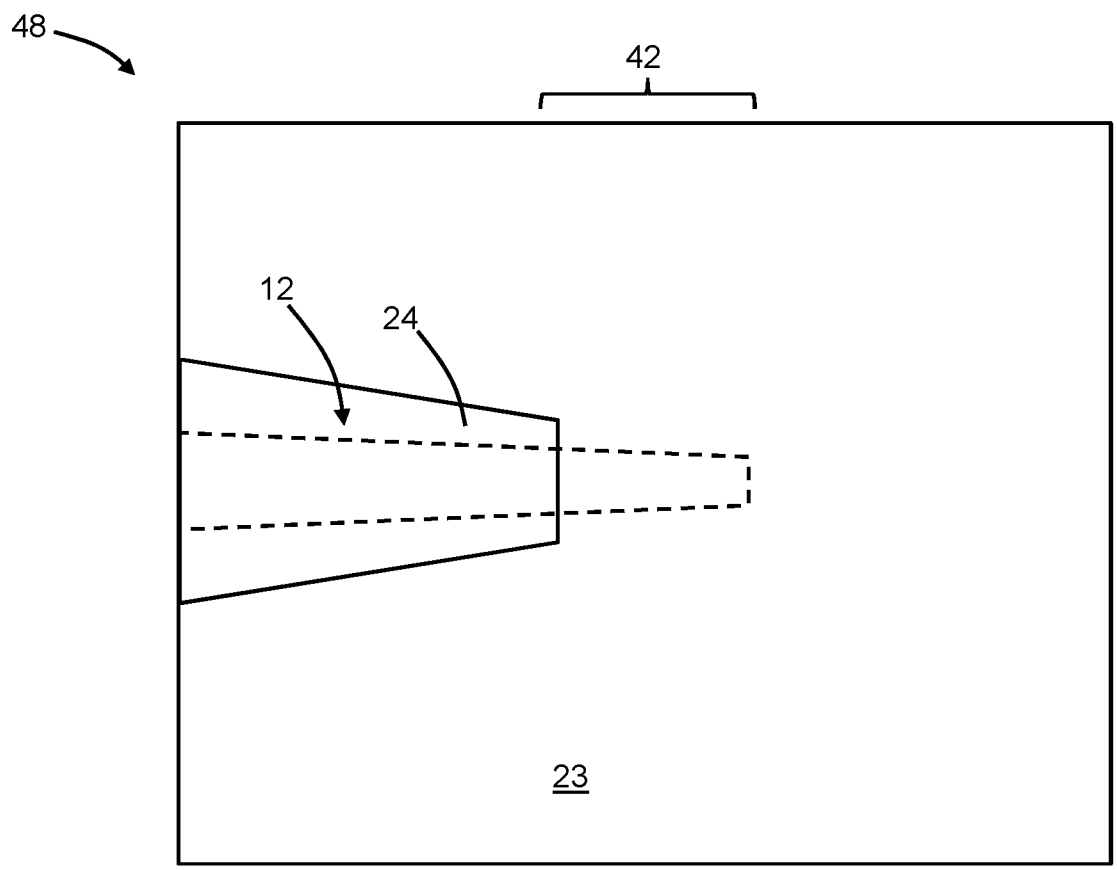

With reference to FIG. 12 and in accordance with alternative embodiments of the invention, the dielectric layer 24 may be patterned in the vicinity of the structure 10 before depositing the dielectric layer 25. In that regard, the dielectric layer 24 may be removed from region 42, also shaped to form, for example, a taper over the waveguide core 12 in the local vicinity of the structure 10, and also removed from beneath the subsequently-formed waveguide cores 26, 28 in the vicinity of the structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate+/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power splitter/combiner, the structure comprising:
   a first waveguide core including a first end surface, a first tapered section that tapers toward the first end surface, and a first bend, the first tapered section longitudinally positioned between the first end surface and the first bend;
   a second waveguide core positioned adjacent to the first waveguide core, the second waveguide core including a second end surface, a second tapered section that tapers toward the second end surface, and a second bend, the second tapered section longitudinally positioned between the second end surface and the second bend, and the second bend diverging relative to the first bend in order to increase a spacing between the first waveguide core and the second waveguide core; and
   a third waveguide core positioned in a different level than the first waveguide core and the second waveguide core, the third waveguide core including a third end surface and a third tapered section that tapers toward the third end surface, and the third tapered section including a first portion laterally positioned between the first tapered section of the first waveguide core and the second tapered section of the second waveguide core,
   wherein the third waveguide core is positioned below the first waveguide core and the second waveguide core, the third waveguide core comprises single-crystal silicon, and the first waveguide core and the second waveguide core comprise silicon nitride.

2. The structure of claim 1 wherein the first tapered section and the second tapered section each taper longitudinally in a first direction, and the third tapered section tapers longitudinally in a second direction opposite to the first direction.

3. The structure of claim 1 further comprising:
   a dielectric layer positioned in part between the third waveguide core and the first waveguide core and in part between the second waveguide core and the first waveguide core.

4. The structure of claim 1 wherein the first tapered section includes a portion that terminates at the first end surface, the second tapered section includes a portion that terminates at the second end surface, the first portion of the third tapered section terminates at the third end surface, and the first portion of the third tapered section is laterally positioned between the portion of the first tapered section and the portion of the second tapered section.

5. The structure of claim 4 wherein the portion of the first tapered section and the portion of the second tapered section are symmetrically arranged relative to the first portion of the third tapered section.

6. The structure of claim 4 wherein the portion of the first tapered section and the portion of the second tapered section are asymmetrically arranged relative to the first portion of the third tapered section.

7. The structure of claim 1 further comprising:
a fourth waveguide core including a fourth end surface and a fourth tapered section that tapers toward the fourth end surface, the fourth tapered section positioned adjacent to the first tapered section.

8. The structure of claim 7 further comprising:
a fifth waveguide core including a fifth end surface and a fifth tapered section that tapers toward the fifth end surface, the fifth tapered section positioned adjacent to the second tapered section with the first tapered section and the second tapered section laterally between the fourth tapered section and the fifth tapered section.

9. The structure of claim 1 wherein the third waveguide core includes a second portion, the first portion is longitudinally positioned between the first end surface and the second portion, and further comprising:
a tapered dielectric layer positioned over the second portion of the third waveguide core and not over the first portion of the third waveguide core.

10. A structure for an optical power splitter/combiner, the structure comprising:
a first waveguide core including a first end surface, a first tapered section that tapers toward the first end surface, and a first bend, the first tapered section longitudinally positioned between the first end surface and the first bend;
a second waveguide core positioned adjacent to the first waveguide core, the second waveguide core including a second end surface, a second tapered section that tapers toward the second end surface, and a second bend, the second tapered section longitudinally positioned between the second end surface and the second bend, and the second bend diverging relative to the first bend in order to increase a spacing between the first waveguide core and the second waveguide core; and
a third waveguide core positioned in a different level than the first waveguide core and the second waveguide core, the third waveguide core including a third end surface and a third tapered section that tapers toward the third end surface, and the third tapered section including a first portion laterally positioned between the first tapered section of the first waveguide core and the second tapered section of the second waveguide core,
wherein the third waveguide core is positioned above the first waveguide core and the second waveguide core, the third waveguide core comprises silicon nitride, and the first waveguide core and the second waveguide core comprise single-crystal silicon.

11. The structure of claim 10 wherein the first tapered section and the second tapered section each taper longitudinally in a first direction, and the third tapered section tapers longitudinally in a second direction opposite to the first direction.

12. The structure of claim 10 further comprising:
a dielectric layer positioned in part between the third waveguide core and the first waveguide core and in part between the second waveguide core and the first waveguide core.

13. The structure of claim 10 wherein the first tapered section includes a portion that terminates at the first end surface, the second tapered section includes a portion that terminates at the second end surface, the first portion of the third tapered section terminates at the third end surface, and the first portion of the third tapered section is laterally positioned between the portion of the first tapered section and the portion of the second tapered section.

14. The structure of claim 13 wherein the portion of the first tapered section and the portion of the second tapered section are symmetrically arranged relative to the first portion of the third tapered section.

15. The structure of claim 13 wherein the portion of the first tapered section and the portion of the second tapered section are asymmetrically arranged relative to the first portion of the third tapered section.

16. A method of forming a structure for an optical power splitter/combiner, the method comprising:
forming a first waveguide core including a first end surface, a first tapered section that tapers toward the first end surface, and a first bend, wherein the first tapered section is longitudinally positioned between the first end surface and the first bend;
forming a second waveguide core positioned adjacent to the first waveguide core, wherein the second waveguide core includes a second end surface, a second tapered section that tapers toward the second end surface, and a second bend, the second tapered section is longitudinally positioned between the second end surface and the second bend, and the second bend diverges relative to the first bend in order to increase a spacing between the first waveguide core and the second waveguide core;
forming a third waveguide core positioned in a different level than the first waveguide core and the second waveguide core and including a third end surface and a third tapered section that tapers toward the third end surface, wherein the third tapered section includes a portion that is laterally positioned between the first tapered section of the first waveguide core and the second tapered section of the second waveguide core,
wherein the third waveguide core is positioned below the first waveguide core and the second waveguide core, the third waveguide core comprises single-crystal silicon, and the first waveguide core and the second waveguide core comprise silicon nitride.

17. The method of claim 16 wherein the first tapered section and the second tapered section taper longitudinally in a first direction, and the third tapered section tapers longitudinally in a second direction opposite to the first direction.

18. The method of claim 16 further comprising:
depositing a dielectric layer that is positioned in part between the third waveguide core and the first waveguide core and in part between the second waveguide core and the first waveguide core.

19. The method of claim 16 wherein the first tapered section includes a portion that terminates at the first end surface, the second tapered section includes a portion that terminates at the second end surface, the portion of the third tapered section terminates at the third end surface, and the portion of the third tapered section is laterally positioned between the portion of the first tapered section and the portion of the second tapered section.

20. The method of claim 16 further comprising:

forming a fourth waveguide core including a fourth end surface and a fourth tapered section that tapers toward the fourth end surface, wherein the fourth tapered section is positioned adjacent to the first tapered section.

* * * * *